(12) United States Patent
Earle

(10) Patent No.: US 8,430,415 B2
(45) Date of Patent: Apr. 30, 2013

(54) BICYCLE REAR SUSPENSION SYSTEM

(75) Inventor: David Earle, Watsonville, CA (US)

(73) Assignee: Sotto Group LLC, Watsonville, CA (US)

(*) Notice: Subject to any disclaimer, the term of this patent is extended or adjusted under 35 U.S.C. 154(b) by 242 days.

(21) Appl. No.: 13/046,755

(22) Filed: Mar. 13, 2011

(65) Prior Publication Data

US 2011/0227312 A1    Sep. 22, 2011

Related U.S. Application Data

(60) Provisional application No. 61/340,344, filed on Mar. 16, 2010.

(51) Int. Cl.
*B62K 25/28* (2006.01)

(52) U.S. Cl.
USPC .......................................... 280/284; 384/255

(58) Field of Classification Search .................. 280/283, 280/284; 384/255
See application file for complete search history.

(56) References Cited

U.S. PATENT DOCUMENTS

| | | | |
|---|---|---|---|
| 6,206,397 B1 * | 3/2001 | Klassen et al. | 280/284 |
| 6,712,374 B2 * | 3/2004 | Assier | 280/284 |
| RE39,159 E * | 7/2006 | Klassen et al. | 280/284 |
| 2003/0160421 A1 * | 8/2003 | Assier | 280/283 |
| 2009/0261557 A1 * | 10/2009 | Beale et al. | 280/284 |
| 2011/0018228 A1 * | 1/2011 | Beale et al. | 280/284 |

* cited by examiner

*Primary Examiner* — Kevin Hurley
(74) *Attorney, Agent, or Firm* — Muncy, Geissler, Olds & Lowe, PLLC

(57) ABSTRACT

A bicycle rear suspension system is connected between front and rear triangles. The suspension system includes an eccentric bearing unit disposed within one of the front and rear triangles, a connecting member connected pivotally to the other one of the front and rear triangles, and a pivot. The eccentric bearing unit includes an outer bearing, and an inner bearing movable within the outer bearing along an annular path. The pivot extends through the inner bearing of the eccentric bearing unit and into the connecting member such that, application of a force to the rear triangle results in pivoting movement of the rear triangle relative to the front triangle, and movement of the inner bearing along the annular path.

20 Claims, 12 Drawing Sheets

BICYCLE REAR SUSPENSION SYSTEM

CROSS-REFERENCE TO RELATED APPLICATION

This application claims priority of U.S. provisional application No. 61/340,344, filed on Mar. 16, 2010, which is incorporated herein by reference.

BACKGROUND OF THE INVENTION

1. Field of the Invention

This invention relates to a rear suspension system adapted to be disposed on a bicycle having a rear wheel rotatable about a pivot point of a front triangle, and more particularly to a lightweight bicycle rear suspension system that is comprised of a small number of parts and that has a relatively high lateral stiffness.

2. Description of the Related Art

A conventional bicycle frame typically includes a front triangle, a rear triangle, and a shock-absorbing unit connected between the front and rear triangles. The front triangle includes a head or steering tube, a top tube, a down tube, a seat tube, and a bottom bracket mounted with a crank and pedal assembly. The rear triangle includes a seat stay and a chain stay.

FIG. 1 shows a first conventional rear suspension system 100 that is disposed on a bicycle frame, and that includes a shock absorber 101 and a single connecting rod 102 that are used to interconnect front and rear triangles 200, 300. While the first conventional rear suspension system 100 is simple in construction and lightweight, it is not sufficient in lateral stiffness, thereby affecting adversely the ride characteristics.

With further reference to FIG. 2, to promote the lateral stiffness, a second conventional rear suspension system 400 includes a shock absorber 401 and two connecting rods 402, 403. However, the lateral stiffness of the second conventional rear suspension system 400 is still insufficient due to lack of a connecting rod between a seat stay 301 and a chain stay 302 similar to the connecting rod 102 of the first conventional rear suspension system 100.

FIGS. 3, 4, and 5 show variations 500, 600, 700 of the conventional rear suspension systems 100, 400 of FIGS. 1 and 2, which have the same stiffness issues.

FIGS. 6, 7, and 8 show linkage systems 801, 802, 803, each of which can be added to the bicycle frame shown in FIG. 1 to increase stiffness. The linkage systems 801, 802, 803 have numerous disadvantages. For example, they are heavy, expensive to make, and complicated in construction.

SUMMARY OF THE INVENTION

The object of this invention is to provide a bicycle rear suspension system that is lightweight, cost-effective, and simple in construction.

Accordingly, a bicycle rear suspension system of this invention is adapted to be connected between front and rear triangles of a bicycle frame. The bicycle rear suspension system includes an eccentric bearing unit disposed within one of the front and rear triangles, and a connecting member connected pivotally to the other one of the front and rear triangles. The eccentric bearing unit includes an outer bearing, and an inner bearing movable within the outer bearing along an annular path. A pivot extends through the inner bearing and into the connecting member such that application of a force to the rear triangle results in movement of the inner bearing along the annular path. Since the bicycle rear suspension system is comprised of a small number of parts, it is lightweight, cost-effective, and simple in construction. Riding performance advantages of this design are seen in the stiffness of the bike which will lead the rider to have increased control of the bike in all conditions, thus allowing the recreational rider to have more fun and the competitive racer to go faster. An additional advantage is using the timing of the eccentric bearing to control shock rate, thus allowing the rider to have a smoother and more predictable ride, and the recreational rider to have a more enjoyable experience and the professional faster racing times.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
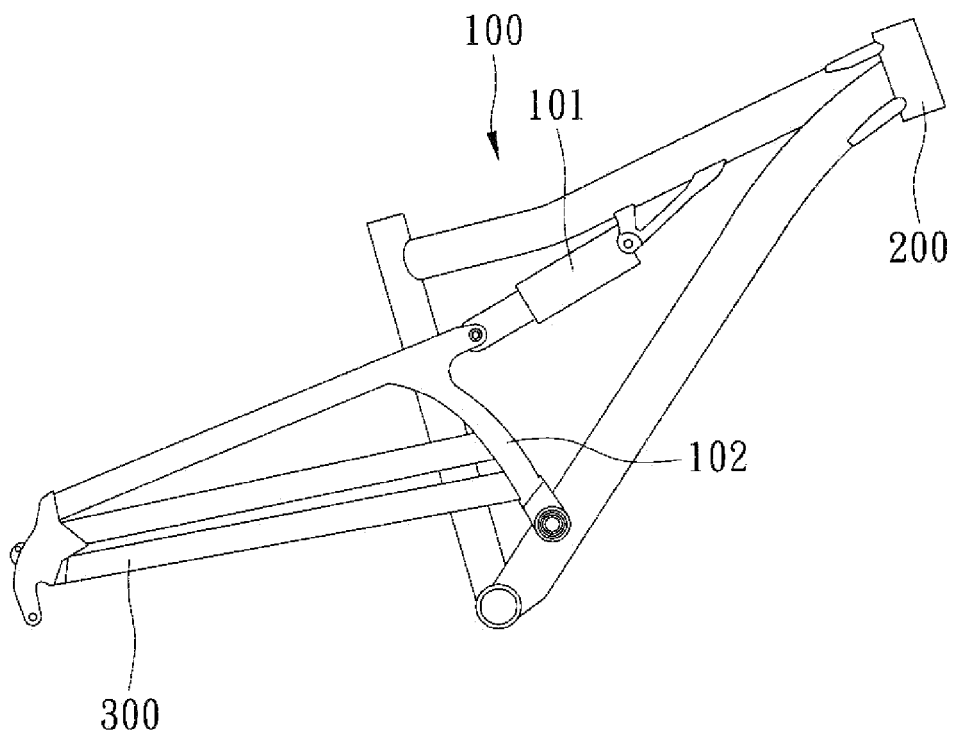
FIG. 1 is a side view of a bicycle frame incorporating a first conventional rear suspension system.
Figure 2:
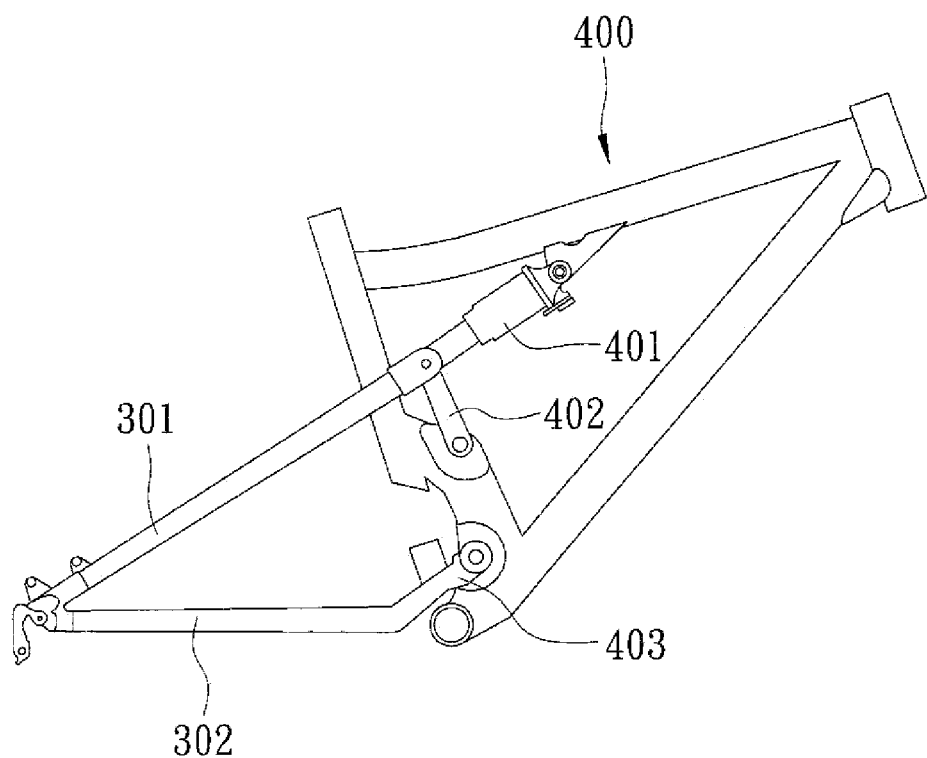
FIG. 2 is a schematic side view of another bicycle frame incorporating a second conventional rear suspension system.
Figure 3:
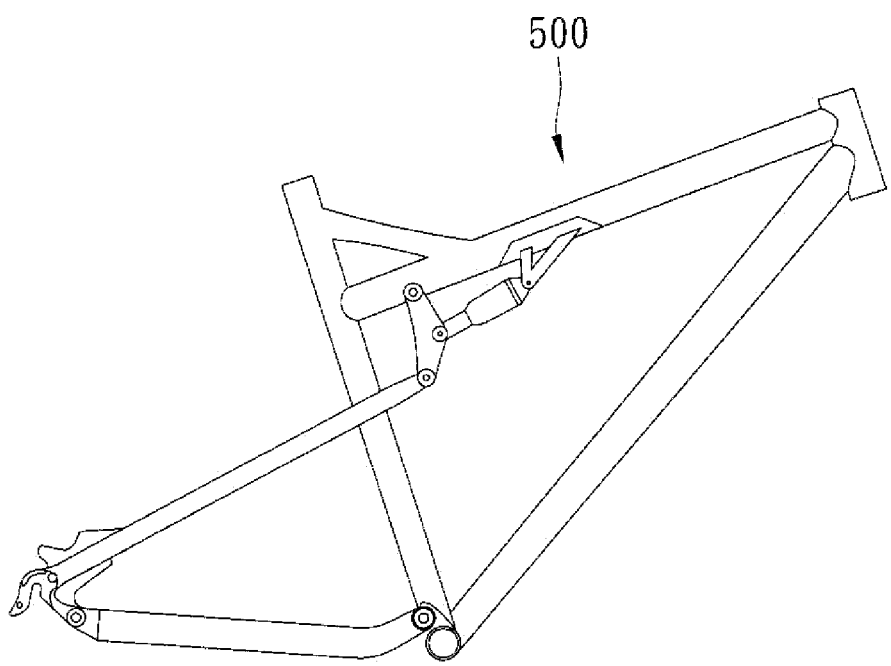
FIGS. 3, 4, and 5 are schematic side views showing variations of the bicycle frames shown in FIGS. 1 and 2.
Figure 4:
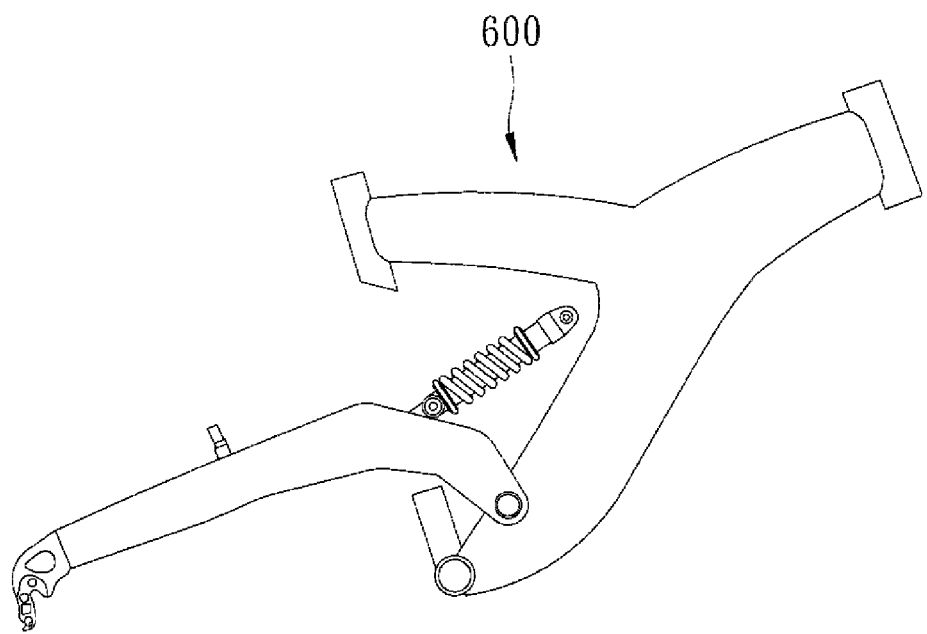
Figure 5:
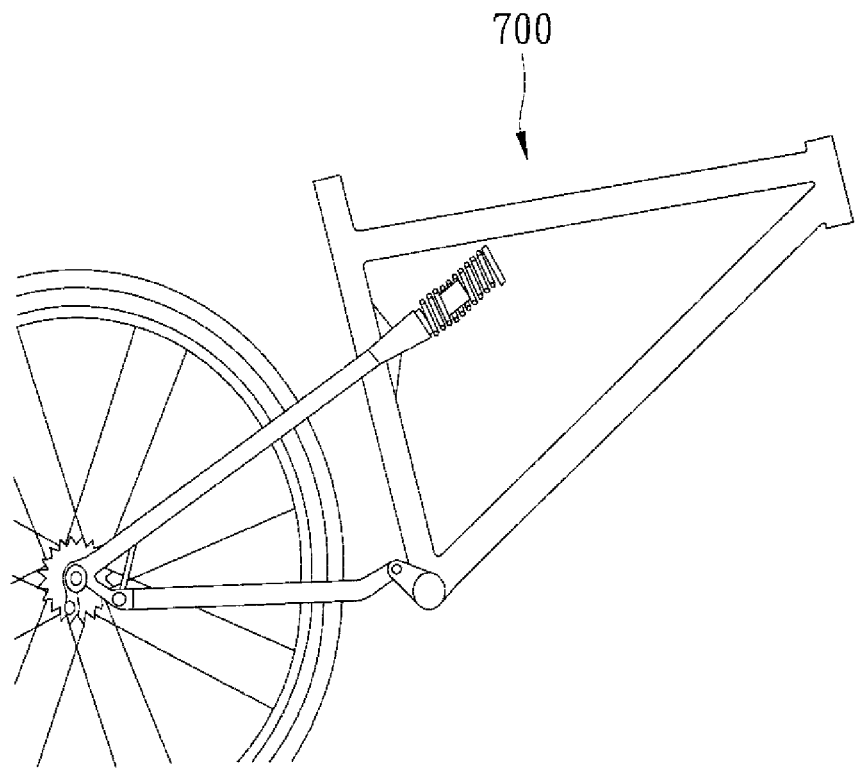
Figure 6:
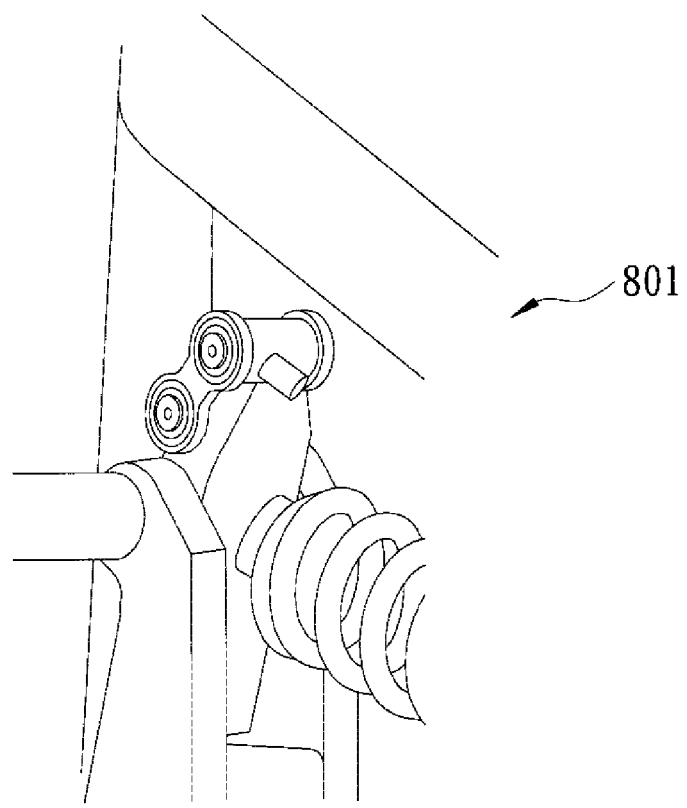
FIGS. 6, 7, and 8 are schematic views showing linkage systems, each of which can be added to the bicycle frame shown in FIG. 1.
Figure 7:
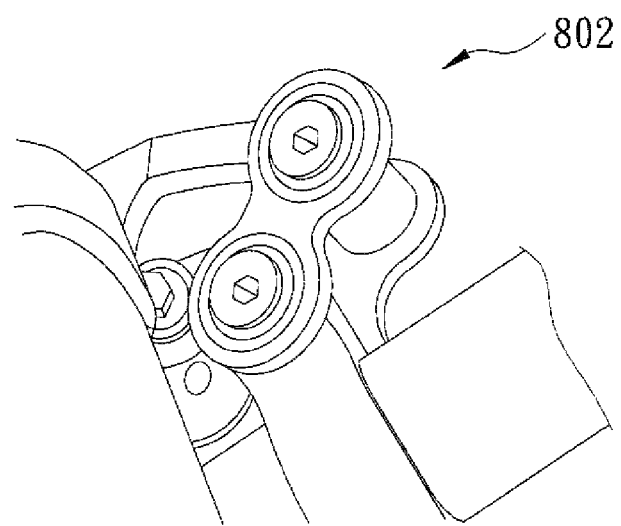
Figure 8:
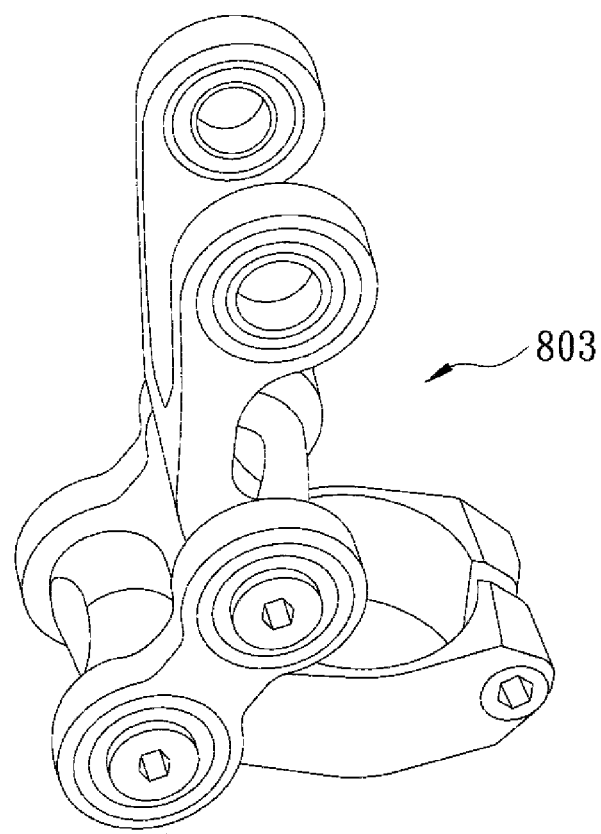
Figure 9:
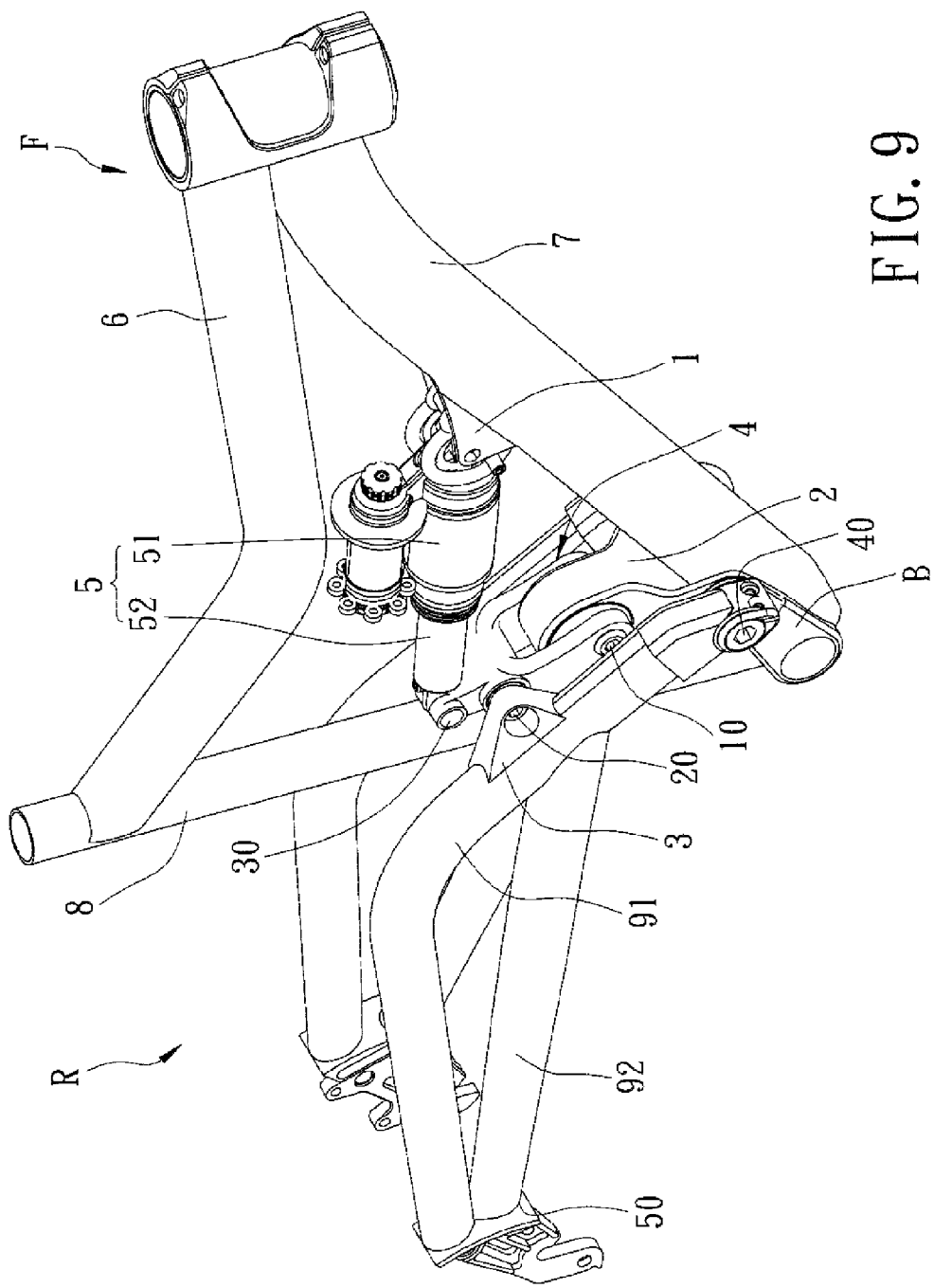
FIG. 9 is a perspective view of the preferred embodiment of a rear suspension system according to this invention, and front and rear triangles of a bicycle.
Figure 10:
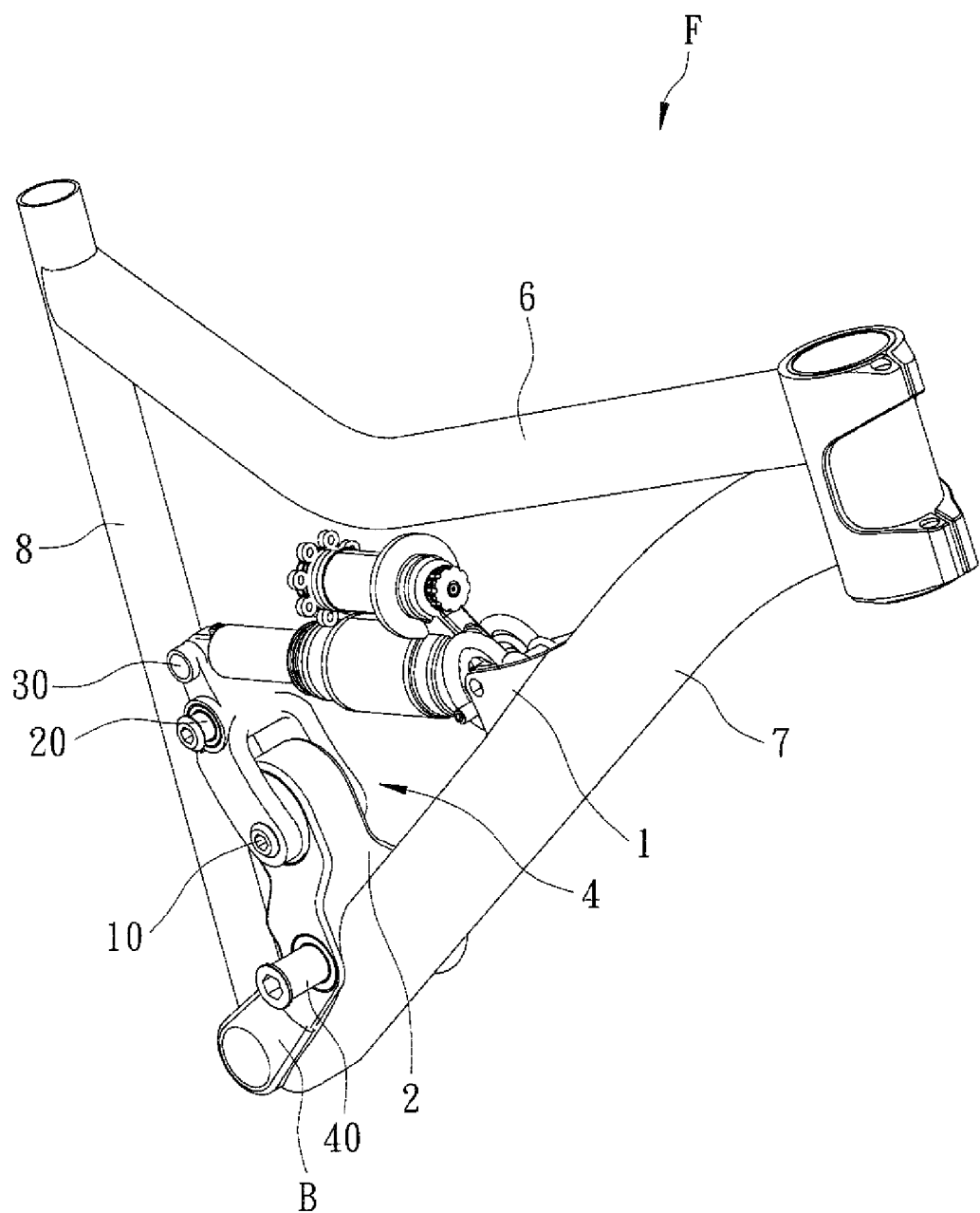
FIG. 10 is a perspective view of the preferred embodiment and the front triangle.

The preferred embodiment of a rear suspension system according to this invention is disposed on a bicycle that has a front triangle (F) and a rear triangle (R). Referring to FIGS. 9 and 10, the front triangle (F) includes a top tube 6, a down tube 7, and a seat tube 8, and the rear triangle (R) includes a seat stay 91 and a chain stay 92. A bottom bracket (B) is connected between lower ends of the down tube 7 and the seat tube 8. The down tube 7 has a first protrusion 1 at a middle portion thereof, and a bridge 2 adjacent to the bottom bracket (B). The seat stay 91 has a second protrusion 3.

The rear suspension system is connected between the front and rear triangles (F, R), and includes an eccentric bearing unit, a connecting member 4, and a shock absorber 5 in the form of a damping cylinder. The shock absorber 5 includes a cylinder body 51 and a piston rod 52 extending movably into the cylinder body 51.

Figure 11:
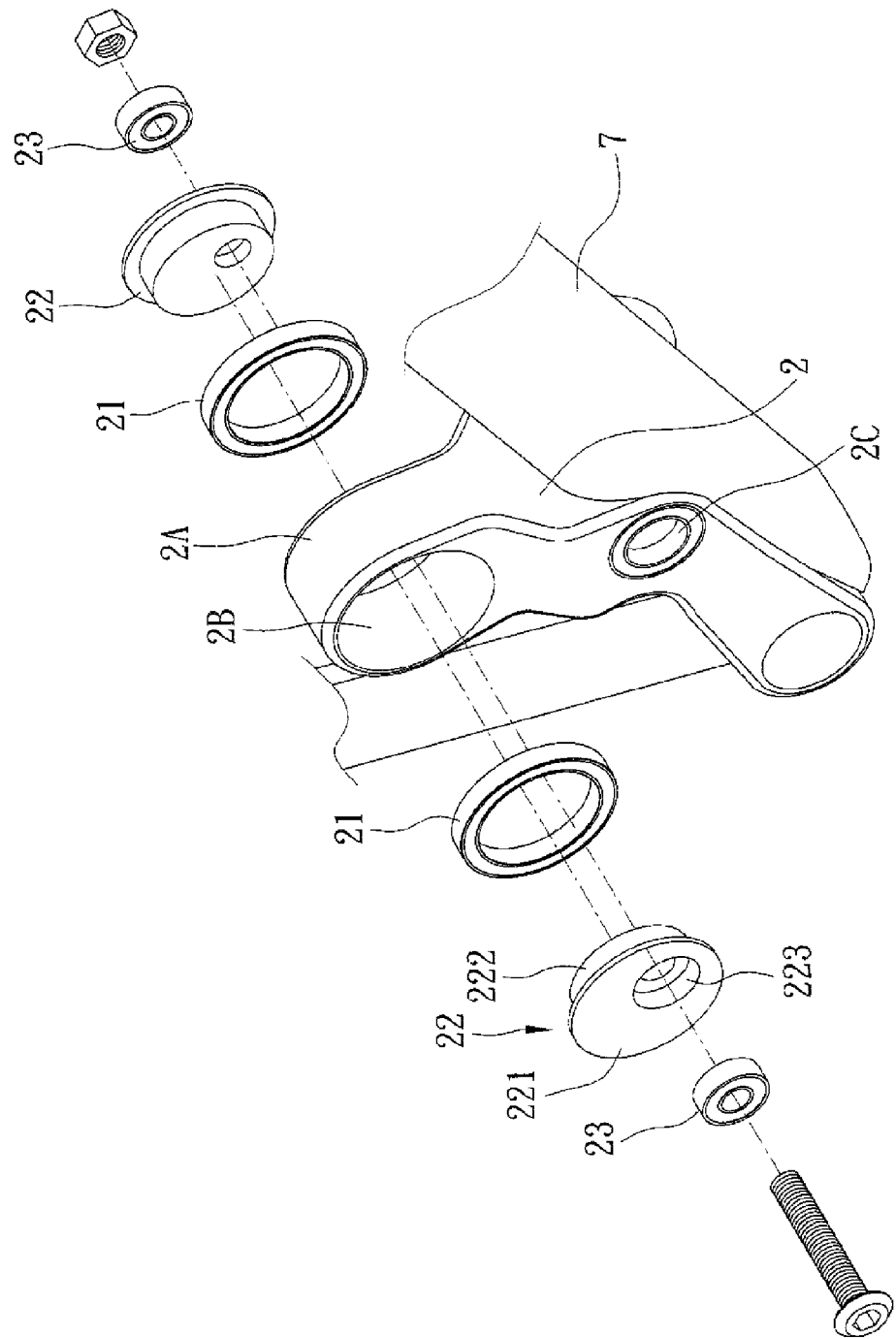
FIG. 11 is a schematic view of an eccentric bearing unit of the preferred embodiment.

With further reference to FIG. 11, the bridge 2 has a surrounding wall 2A defining a cylindrical first hole 2B, and a second hole 20 disposed below the cylindrical first hole 2B. The eccentric bearing unit includes an outer bearing unit consisting of two outer bearings 21, two retainers 22, and an inner bearing unit consisting of two inner bearings 23. The outer bearings 21 are disposed within the cylindrical first hole 2B in the bridge 2, and are spaced apart from each other in a left-to-right direction. Each of the retainers 22 includes a disk portion 221 having opposite inner and outer side surfaces, a cylindrical insert portion 222 extending from a central portion of the inner side surface of the disk portion 221, and an eccentric counterbore 223 formed in the outer side surface of the disk portion 221. The disk portions 221 of the retainers 22 are aligned respectively with and rotatable respectively relative to two opposite end surfaces (i.e., left and right end surfaces) of the surrounding wall 2A, and are sized so as not to move into the cylindrical hole 2B in the bridge 2. The insert portions 222 of the retainers 22 extend respectively into the outer bearings 21. The insert portion 222 of each of the retainers 22 is disposed between the corresponding outer bearing 21 and the corresponding inner bearing 23. The outer bearings 21 and the retainers 22 are sized so as to allow for rotation of the retainers 22 within the cylindrical first hole 2B, while preventing rotation of outer races of the outer bearings 21 within the cylindrical first hole 2B. The inner bearings 23 are fitted respectively within the counterbores 223 in the retainers 22. As such, each of the inner bearings 23 is movable within the cylindrical first hole 28 in the bridge 2 along an annular path. Alternatively, the eccentric bearing unit may include only one outer bearing 21, only one retainer 22, and only one inner bearing 23.

The connecting member 4 is connected to the eccentric bearing unit by a first pivot 10 extending through the connecting member 4 and the inner bearings 23, and is connected pivotally to the second protrusion 3 and a rear end of the piston rod 52 of the shock absorber 5 by second and third pivots 20, 30, respectively. A front end of the cylinder body 51 of the shock absorber 5 is connected pivotally to the first protrusion 1. In this embodiment, since the piston rod 52 extends downwardly and rearwardly from the cylinder body 51, the first, second, and third pivots 10, 20, 30 are disposed under the shock absorber 5. The second pivot 20 is disposed behind and above the first pivot 10, and in front of and below the third pivot 30. A front end of the rear triangle (R) is connected pivotally to the front triangle (F) by a pivot member or fourth pivot 40, which is disposed directly above and adjacent to the bottom bracket (B) and which extends into the second hole 2C in the bridge 2. The rear triangle (R) is provided with two dropouts 50 at a rear end thereof. A rear wheel (not shown) is connected to the dropouts 50. As such, the rear wheel is rotatable about a pivot point (i.e., the fourth pivot 40) of the front triangle (F). In this embodiment, the centers of the inner bearings 23 are located respectively within inner peripheries of the outer bearings 21, and outer peripheries of the inner bearings 23 are located respectively within outer peripheries of the outer bearings 21. In other embodiments, the outer bearings 23 may be disposed on the rear triangle (R). If this occurs, the connecting member 4 will be connected pivotally to the front triangle (F).

Figure 12:
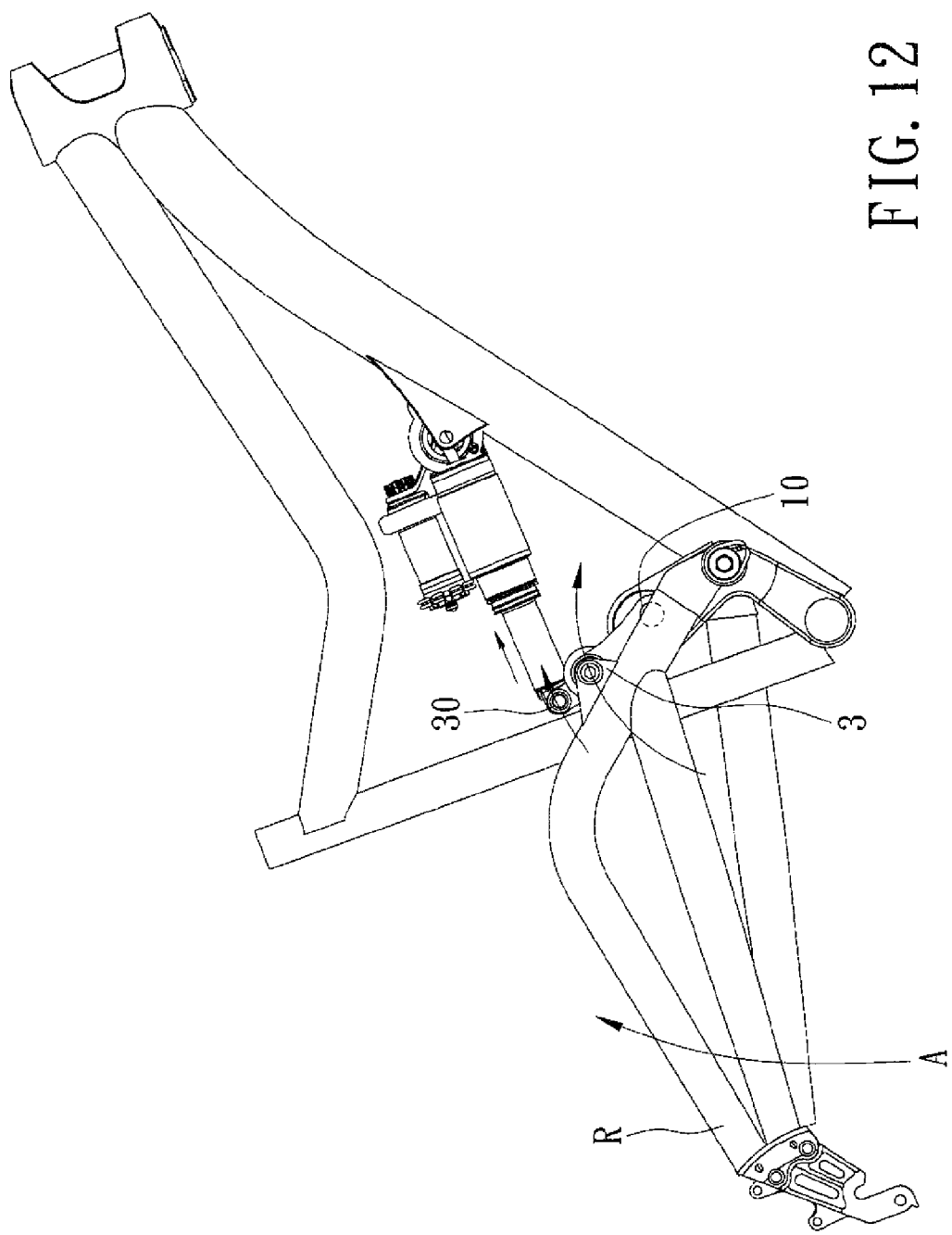
FIG. 12 is a schematic side view illustrating motions of a shock absorber and a connecting member of the preferred embodiment when an upward force is applied to the rear triangle.

With further reference to FIG. 12, when an upward force (A) is applied to the rear triangle (R), the second protrusion 3 rotates clockwise about the fourth pivot 40. Hence, the third pivot 30 pushes and moves the piston rod 52 into the cylinder body 51 (i.e., the total length of the shock absorber 5 is reduced) to thereby retard pivoting movement of the rear triangle (R) relative to the front triangle (F). At the same time, since the first pivot 10 extends fittingly through the inner bearings 23, each of the inner bearings 23 moves along the annular path in the cylindrical first hole 2B.

In view of the above, since the rear suspension system of this invention is comprised of a small number of parts, it is simple in construction, cost-effective, and lightweight.

Furthermore, due to the presence of the eccentric bearing unit, the lateral stiffness and the shock-absorbing effect of the rear suspension system are improved. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A bicycle frame comprising:
    a front triangle;
    a rear triangle disposed behind and connected pivotally to said front triangle such that said rear triangle is rotatable about a pivot point of said front triangle; and
    a suspension system including
        an eccentric bearing unit including an outer bearing disposed within one of said front triangle and said rear triangle, and an inner bearing movable within said outer bearing along an annular path;
        a connecting member connected pivotally to the other one of said front triangle and said rear triangle; and
        a first pivot extending through said inner bearing of said eccentric bearing unit and into said connecting member such that, application of a force to said rear triangle results in pivoting movement of said rear triangle relative to said front triangle, and movement of said inner bearing along said annular path.

2. The bicycle frame as claimed in claim 1, wherein said suspension system further includes a shock absorber connected pivotally to said front triangle.

3. The bicycle frame as claimed in claim 2, wherein said front triangle includes a down tube that has a first protrusion, and said shock absorber includes a cylinder body having a front end connected pivotally to said first protrusion, and a piston rod extending movably into said cylinder body.

4. The bicycle frame as claimed in claim 3, wherein said piston rod extends downwardly and rearwardly from said cylinder body.

5. The bicycle frame as claimed in claim 3, wherein said rear triangle includes a seat tube that has a second protrusion, and said bicycle frame further comprises a second pivot for connecting said connecting member pivotally to said second protrusion.

6. The bicycle frame as claimed in claim 5, wherein said second pivot is disposed behind and above said first pivot.

7. The bicycle frame as claimed in claim 5, wherein said piston rod has a rear end, and said bicycle frame further comprises a third pivot for connecting said connecting member pivotally to said rear end of said piston rod.

8. The bicycle frame as claimed in claim 7, wherein said second pivot is disposed in front of and below said third pivot.

9. The bicycle frame as claimed in claim 1, wherein:
    said front triangle includes a down tube, a seat tube, and a bottom bracket connected between said down tube and said seat tube, said down tube having a bridge disposed adjacent to said bottom bracket and formed with a cylindrical hole, said inner bearing being disposed within said cylindrical hole; and
    said outer bearing is disposed in said cylindrical hole in said bridge.

10. The bicycle frame as claimed in claim 9, further comprising a fourth pivot for connecting said rear triangle pivotally to said front triangle, said fourth pivot being disposed directly above and adjacent to said bottom bracket.

11. The bicycle frame as claimed in claim 9, wherein:
said bridge has a surrounding wall defining said cylindrical hole and having an end surface; and
said eccentric bearing unit further includes a retainer having a disk portion that is aligned with and rotatable relative to said end surface of said surrounding wall of said bridge, a cylindrical insert portion extending from a central portion of a side surface of the disk portion and extending into said outer bearing, and an eccentric counterbore formed in said disk portion, said inner bearing being fitted within said eccentric counterbore.

12. The bicycle frame as claimed in claim 1, wherein a center of said inner bearing is located within an inner periphery of said outer bearing.

13. The bicycle frame as claimed in claim 1, wherein said inner bearing has an outer periphery that is located within an outer periphery of said outer bearing.

14. A bicycle frame comprising:
a front triangle having a pivot point adjacent to a lower rear end;
a rear triangle connected at a front end to said pivot point and having at a rear end one or more dropouts adapted to be configured to engage a bicycle wheel, wherein said rear end of said rear triangle is rotatable about said pivot point of said front triangle; and
a suspension system disposed above said pivot point and including
an eccentric bearing unit having an outer bearing disposed within one of said front triangle and said rear triangle, and an inner bearing movable within said outer bearing along an annular path, wherein a center of said inner bearing is located within an inner periphery of said outer bearing,
a connecting member connected pivotally to the other one of said front triangle and said rear triangle, and
a pivot extending through said inner bearing and into said connecting member such that application of a force to said rear triangle results in pivoting movement of said rear triangle relative to said front triangle and movement of said inner bearing along said annular path.

15. The bicycle frame of claim 14, wherein said suspension system further includes a shock absorber having a cylinder body connected pivotally to said front triangle and a piston rod extending movably into said cylinder body and connected pivotally to said rear triangle such that application of said force results in movement of said piston rod into said cylinder body to retard movement of said rear triangle relative to said front triangle.

16. A rear suspension system for a bicycle frame, the bicycle frame including a front triangle, said rear suspension system comprising:
a bridge adapted for forming a portion of the front triangle, said bridge having a surrounding wall formed with a first hole;
an eccentric bearing unit that includes:
at least one inner bearing and at least one outer bearing each disposed within said first hole such that a center of said inner bearing is located within an inner periphery of said outer bearing, wherein said inner bearing is movable within said outer bearing along an annular path, and
at least one retainer having a disk portion that is aligned with and rotatable relative to a surface of said surrounding wall and that is sized so as not to move into said first hole in said bridge, an insert portion extending from a side surface of said disk portion into said outer bearing, and an eccentric counterbore formed in said disk portion for housing said inner bearing; and
a pivot extending through said counterbore and inner bearing such that application of a force to said first pivot results in movement of said inner bearing along said annular path within said first hole.

17. The rear suspension system of claim 16, wherein said insert portion is disposed between said outer bearing and said inner bearing, and said inner bearing has an outer periphery that is located within an outer periphery of said outer bearing.

18. The rear suspension system of claim 16, wherein said outer bearing and said retainer are sized to allow rotation of said retainer within said first hole while preventing rotation of an outer race of said outer bearing within said first hole.

19. The rear suspension system of claim 16, wherein said eccentric bearing unit includes a pair of said inner bearings, a pair of said outer bearings, and a pair of said retainers, each pair of said inner bearing, said outer bearings, and said retainers being disposed respectively proximate to two opposite sides of said first hole.

20. The rear suspension system of claim 16, the bicycle frame further including a rear triangle disposed behind the front triangle, wherein said bridge includes a second hole disposed below said first hole, said rear suspension system further comprising a pivot member extending into said second hole in said bridge and adapted to extend into the rear triangle so as to pivotally interconnect the front and rear triangles of the bicycle frame.

* * * * *

UNITED STATES PATENT AND TRADEMARK OFFICE
CERTIFICATE OF CORRECTION

PATENT NO. : 8,430,415 B2  
APPLICATION NO. : 13/046755  
DATED : April 30, 2013  
INVENTOR(S) : Earle et al.

Page 1 of 1

It is certified that error appears in the above-identified patent and that said Letters Patent is hereby corrected as shown below:

Title Page, Item (12) delete "Earle" and insert --Earle et al.--.

Title Page, Item (75) Inventor:

should read

--(75) Inventors: David Earle, Watsonville, CA (US); Luther Beale, Portland, OR (US)--.

Signed and Sealed this
Twentieth Day of October, 2015

Michelle K. Lee
*Director of the United States Patent and Trademark Office*